United States Patent [19]

DeJager et al.

[11] Patent Number: 4,796,962
[45] Date of Patent: Jan. 10, 1989

[54] OPTICAL SCANNER

[75] Inventors: Donald DeJager; David Kessler, both of Rochester, N.Y.

[73] Assignee: Eastman Kodak Company, Rochester, N.Y.

[21] Appl. No.: 29,003

[22] Filed: Mar. 23, 1987

[51] Int. Cl.⁴ .............................................. G02B 26/10
[52] U.S. Cl. ...................................... 350/6.8; 350/6.5
[58] Field of Search ................ 350/6.5, 6.6, 6.7, 6.8; 250/236, 334; 358/53, 54, 63, 199

[56] References Cited

U.S. PATENT DOCUMENTS

| | | | |
|---|---|---|---|
| 3,946,150 | 3/1976 | Grafton. | |
| 4,247,160 | 1/1981 | Brueggemann | 350/6.8 |
| 4,274,703 | 6/1981 | Fisli | 350/6.8 |
| 4,277,128 | 7/1981 | Kawamura | 350/6.8 |
| 4,383,755 | 5/1983 | Fedder et al. | 350/6.8 |
| 4,408,826 | 10/1983 | Ike | 350/6.8 |
| 4,443,055 | 4/1984 | Matsuoka et al. | 350/6.5 |
| 4,474,422 | 10/1984 | Kitamura | 350/6.8 |
| 4,512,625 | 4/1985 | Brueggemann | 350/6.8 |
| 4,547,038 | 10/1985 | Mori | 350/6.6 |
| 4,629,283 | 12/1986 | Plaot | 350/6.8 |
| 4,674,825 | 6/1987 | Tateoka et al. | 350/6.5 |

*Primary Examiner*—John K. Corbin
*Assistant Examiner*—Loha Ben
*Attorney, Agent, or Firm*—Donald D. Schaper

[57] ABSTRACT

An optical scanner is disclosed for scanning a light beam onto a receiving medium. The scanner includes a rotatable polygon for receiving a light beam from a source and for scanning the beam through a predetermined angle, and optical means between the polygon and receiving medium for directing the beam to receiving medium. In order to provide an optical system which produces the desired results at the image plane and is relatively simple to manufacture, two spherical lenses and a cylindrical mirror are interposed between the polygon and receiving medium.

13 Claims, 2 Drawing Sheets

OPTICAL SCANNER

FIELD OF THE INVENTION

The present invention relates to an optical scanner, and more particularly, to an optical scanner which is particularly suitable for use in a laser scanner or printing device.

STATE OF THE PRIOR ART

Optical scanners of a type which are used in laser printers generally include a rotatable polygon which is used to scan a light beam across a receiving medium. The optical elements used in such scanners are designed to achieve a flat tangential field for good beam focus and to correct for so-called pyramidal errors, that is, spot position errors in the cross-scan direction resulting from angular misalignment of the facets on the polygon; the optical elements must also produce a relatively straight scan line and correct for the f-$\theta$ distortion condition. The receiving medium in the scanners can be a photographic film or a photosensitive medium such as a xerographic drum.

In U.S. Pat. No. 4,247,160, there is disclosed a laser beam scanner having a concave cylinder mirror located between the polygon and the photosensitive surface. The concave cylinder mirror, which has positive power in the cross-scan direction but has not power in the scan direction, minimizes pyramidal errors. A negative refractive cylinder lens, with power in the cross-scan plane, is placed between the cylinder mirror and the polygon to compensate for residual cross-scan field curvature.

In U.S. Pat. No. 4,512,625, a lens system is described in which a concave cylinder mirror is used to compensate for pyramidal errors. Two lens elements are used between the cylinder mirror and a rotating polygon. One of the lens elements has negative spherical power, and the other lens element has negative cylindrical power in the cross-scan direction on the front surface and positive spherical power on the rear surface. One of the main problems with the lens systems used in this patent and in U.S. Pat. No. 4,247,160, is that the lenses in the systems are relatively complex which makes the lenses difficult and expensive to manufacture.

SUMMARY OF THE INVENTION

It is an object of the present invention to overcome the problems in the prior art and to provide an optical scanner which is relatively simple to manufacture and provides a beam of the desired characteristics at the receiving medium.

In accordance with the present invention, there is provided an optical scanner for scanning a light beam generated by a light source onto a receiving medium, the scanner comprising: deflector means for scanning the beam through a predetermined angle; optical means interposed between the deflector means and the receiving medium, the optical means comprising a pair of spherical lenses and a cylindrical mirror disposed along an optical axis.

In the preferred embodiment of the present invention, a rotatable polygon is used to deflect a laser beam through a predetermined angle, and a concave cylinder mirror is placed between the polygon and a receiving medium. Two spherical lenses are placed in the optical path between the polygon and the cylinder mirror. An input beam from a light source, such as a laser, passes through the two spherical lenses before it strikes the rotatable polygon. After reflection at the polygon, the beam again passes through the two spherical lenses, is reflected at the concave cylinder mirror, and comes to a waist focus.

One of the main advantages of the present invention is that the lenses have only spherical surfaces which makes them relatively easy to manufacture. Another advantage results from one of the unusual features of the disclosed scanner, namely, that the laser beam is not collimated in the scan direction at the polygon facet. After the beam is reflected by the polygon, it is converging toward a waist focus, and it has been found that superior performance results from this arrangement.

Other features and advantages will become apparent with reference to the following Description of the Preferred Embodiments when read in light of the attached drawings.

DESCRIPTION OF THE PREFERRED EMBODIMENTS

Figure 1:
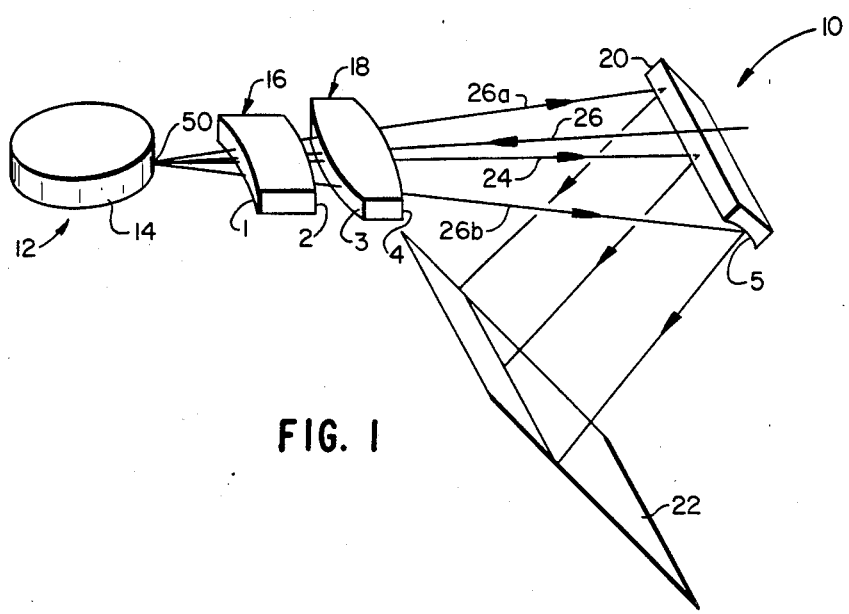
FIG. 1 is a perspective view of one embodiment of the present invention.

With reference to FIG. 1, there is shown an optical scanner 10 constructed in accordance with the present invention. Scanner 10 comprises a deflector means in the form of a rotatable polygon 12 having a plurality of mirrored facets 14, a first spherical lens 16, a second spherical lens 18, a reflecting concave cylinder mirror 20, and a receiving medium 22. A light beam 26, provided by a source (not shown), is directed to polygon 12 which scans the beam 26 through a predetermined angle. Polygon 12 can have, for example, ten facets 14 and a duty cycle of 0.75 in which case the light beam 26 is deflected through angles of ±27°.

Lenses 16 and 18 and cylinder mirror 20 are arranged along an optical axis 24. Light beam 26 can be provided by a source such as a helium-neon laser (not shown) having a wavelength of 632.8 nanometers, or by a semiconductor laser (not shown). As is well known in the art, beam 26 can be modulated by a suitable electro-optical modulator (not shown) in accordance with a video signal to produce a desired image on receiving medium 22. Light beam 26, in traveling from the source (not shown) to the polygon 12, passes through lenses 18 and 16 and forms an angle of approximately 4° with the optical axis 24. Beam 26 is scanned through angles of ±27°. Line 26a shows the beam at +27°, and line 26b shows the beam at −27°; at 0°, the beam is coincident with the optical axis 24. The beam 26, between the source (not shown) and the polygon 12, lies in a vertical plane defined by the optical axis 24 and axis of rotation of the polygon. Cylinder mirror 20 has its normal tilted at a 22½° angle to the optical axis 24.

Details of the lens system used in scanner 10 are shown in Table I.

TABLE I

| Surface | Curvature (mm$^{-1}$) | Thickness (mm) | Glass | Remarks |
|---|---|---|---|---|
| Point 50 | 0.0 | 20.0 | Air | |
| 1 | −.00689735 | 52.0 | SF56 | N = 1.778662 |
| 2 | −.00660073 | 44.93 | Air | |
| 3 | 0.00210986 | 22.0 | BK7 | N = 1.515089 |
| 4 | −.00015748 | 251.74 | Air | |
| 5 (Y-dir) | 0.0 | 125.54 | Air | Cylinder |
| (X-dir) | −.00486604 | | | Mirror |
| Image | 0.0 | 0.0 | Air | |

F-number at image, Y (scan direction) 74.468
F-number at image, X (cross-scan direction) 109.22

The SF56 and BK7 designations in Table I are designations for the type of glass which can be obtained from, for example, the Schott Glass Company.

Figure 3:
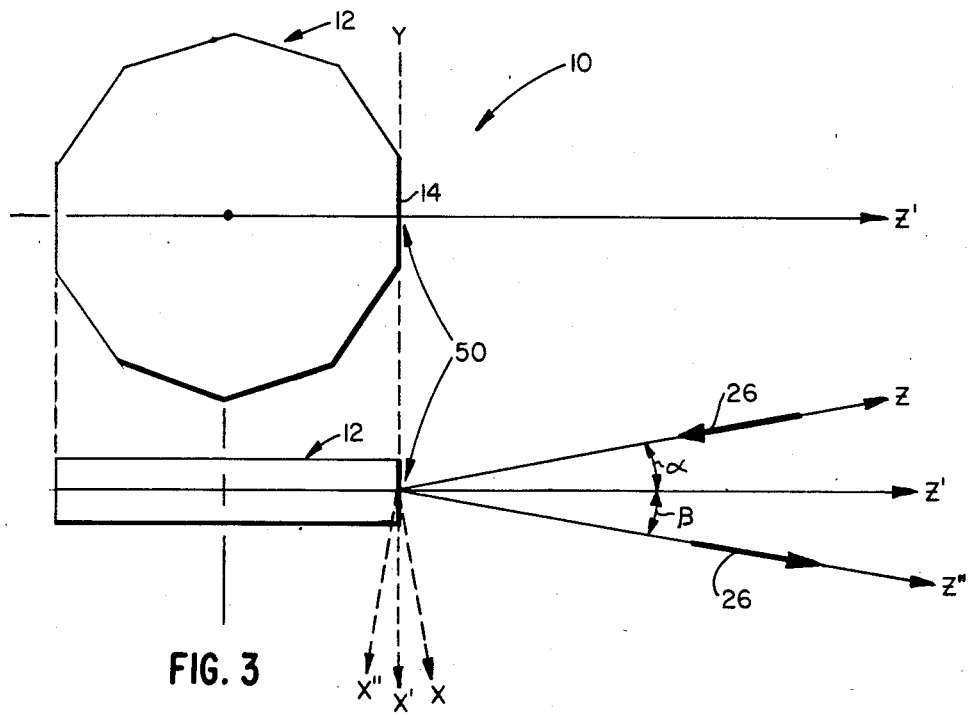
FIG. 3 is a schematic view of the embodiment shown in FIG. 1, with the optical elements omitted, showing the paths of the input beam to the polygon and the output beam from the polygon.

The interaction of beam 26 with polygon 12 is shown in FIG. 3. In FIG. 3, a set of three right-handed orthogonal coordinate systems are shown, all of which have their origins at a common point 50. All of the coordinate systems share a common Y axis which is known as the scan direction axis. Beam 26 enters in the −Z direction through lenses 18 and 16; the angle of incidence α and the angle of reflection β are both 2°. For the particular orientation of polygon 12 shown in FIG. 3, the rotation angle of polygon 12 is said to be zero, and the beam scan angle (with respect to the optical axis 24 of the lenses 16 and 18) is also said to be zero. When the angle of rotation is zero, the Z' axis is normal to the facet 14, and the Z" axis coincides with the optical axis 24 (FIG. 1). In the X'-Y-Z' coordinate system for scanner 10, the center of rotation of the polygon 12 is located at Z'=−38.1 mm, and the axis of rotation of polygon 12 is parallel to the X' axis. As polygon 12 rotates through angles varying from −13.5° through 0° to +13.5°, the reflected beam is scanned through angles from −27° to +27° with respect to the Z" axis.

A narrow fan of rays can be used to simulate the characteristics of a gaussian laser beam in scanner 10. For example, to simulate the characteristics of the gaussian beam in the scan, or tangential direction, one can consider a narrow fan of tangential rays lying in the Y-Z plane, entering along the −Z axis, and incident upon the polygon 12 at point 50. At point 50, the vergence of the beam is +1 diopter, i.e., the rays are converging toward a focus 1000 mm ahead. After the beam has been reflected and passes forward through the lens system, it comes to a focus at the recording medium 22. As noted previously, Applicants have found that they can achieve superior performance in scanner 10, if the beam which enters at the polygon 12 is a converging beam. The two factors which seem most affected by the vergence of the beam are the field flatness for ray fans in the tangential plane and the f-θ distortion condition. It is well known that, as polygon 12 rotates, the facets 14 not only change in angle, but also in position along the optical axis. If the input beam to the polygon is collimated, this axial shift has minimal effect on the f-θ or the tangential field flatness performance of the lens, and this is the reason that known devices often use a collimated input beam. In contrast to this, Applicants have determined that superior overall performance can be obtained by using a converging input beam, and thus, they have taken the axial shift of the facets 14 into consideration in the selection and arrangement of the optical elements.

In order to simulate the characteristics of the gaussian laser beam in the cross-scan or sagittal direction, one can consider a second narrow fan of sagittal rays lying in the X-Z plane (FIG. 3) and entering in the −Z direction. These rays focus to a point at point 50. After the rays are reflected at the facet 14 and pass forward through the lens system, they come to a focus again at the receiving medium 22. Thus, in the cross-scan or sagittal direction, point 50 is conjugate to the image plane at receiving medium 22.

The performance of scanner 10 is given in Table II. The spot radius (X) is in the cross-scan direction. The spot radius (Y) is in the scan direction. These radii were calculated by tracing a gaussian beam through the system. The radii for the gaussian beam are taken to the EXP (−2) intensity point in the beam section. (At point 50, the beam parameters are: beam radius in X-direction, 0.1 mm; beam radius in the Y-direction, 2.5315 mm; radius of curvature in X-direction, 266.91 mm; and radius of curvature in Y-direction, 966.99 mm.) The tangential focus error is in a direction perpendicular to the plane of the receiving medium 22 and is calculated using a conventional Coddington-type ray trace. The deviation from f-θ is in a direction parallel to the scan direction and shows the actual location of the center of the laser spot relative to its ideal location. Two cross-scan error values are given, both in micrometers; the first applies to a +30 arcsec facet tilt angle, and the second applies to a −30 arcsec facet tilt angle at the polygon.

TABLE II

| Scan Angle Θ | 0 | ±9 | ±18 | ±27° |
|---|---|---|---|---|
| Spot Radius (X) (micrometers) | 44.0 | 44.5 | 46.1 | 49.1 |
| Spot Radius (Y) (micrometers) | 30.0 | 30.3 | 31.3 | 32.8 |
| Tangential Focus (millimeters) | 0.0 | −.0031 | 0.0558 | −.0439 |
| Deviation From f-Θ (millimeters) | 0.0 | −.0453 | 0.0419 | −.0088 |
| Cross-scan error for ±30 arcsec. (in micrometers) | 0.015 0.015 | .009 .022 | −.002 0.033 | 0.017 0.014 |

As shown in Table II, the cross-scan error is not zero at θ=0. This is due to sagittal coma which is present anytime the cylinder mirror conjugate distances depart from a 1:1 condition.

Figure 2:
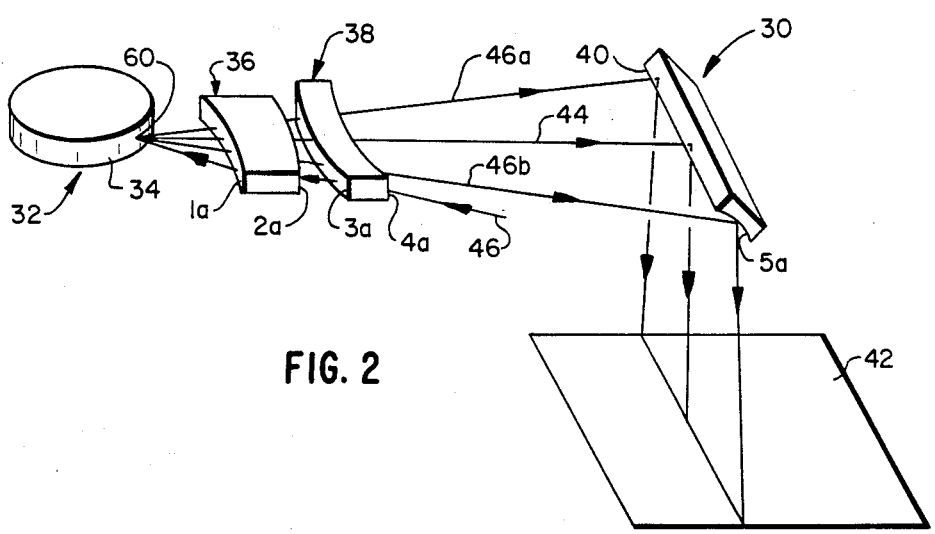
FIG. 2 is a perspective view of a second embodiment of the present invention.
Figure 4:
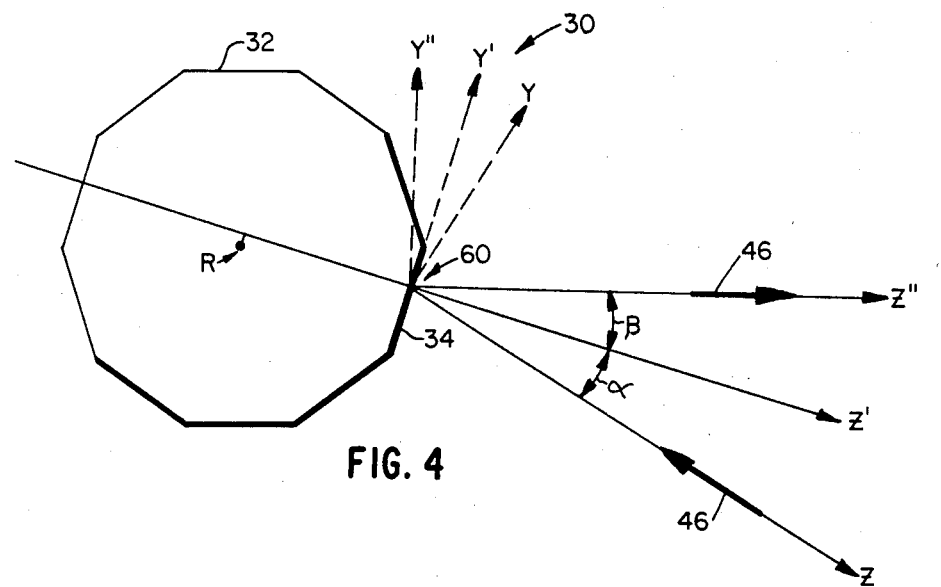
FIG. 4 is a schematic view of the embodiment shown in FIG. 2, with the optical elements omitted, showing the paths of the input beam to the polygon and the output beam from the polygon.

With reference to FIGS. 2 and 4, another embodiment of the present invention is shown. A scanner 30 includes a rotatable polygon 32, a first spherical lens 36, a second spherical lens 38, a reflecting concave cylinder mirror 40, and a recording medium 42. In the embodiment shown in FIG. 2, the cylinder mirror 40 is tilted through an angle of 45°, instead of only 22.5° as in the embodiment shown in FIG. 1. A light beam 46 in traveling from a source (not shown) to polygon 32 passes through lenses 38 and 36 and forms an angle of 30° with an optical axis 44. Beam 46 is scanned through an angle of ±27°, and as the beam is scanned, it defines a plane, the two extremities of which are indicated by lines 46a and 46b. The beam 46, between the light source (not shown) and polygon 32 also lies in the plane defined by the scanning beam, as shown in FIG. 2.

It has been noted herein that superior overall performance of scanners 10 and 30 is achieved by utilizing a converging input beam (at polygon 12 in scanner 10 and at polygon 32 in scanner 30) in the scan direction. The optical means in scanners 10 and 30, which includes lenses 16 and 18 in scanner 10 and lenses 36 and 38 in scanner 30, does cause the input beam to converge as it travels from a source to the polygon 12 in scanner 10 and from a source to the polygon 32 in scanner 30. It will be understood by those skilled in the art that other optical elements (not shown) could be used to cause the beam to converge between a source and the polygons 12, 32, depending on the particular application in which the invention is used. It will also be understood that there may be other optical devices (not shown), for example, a modulator, between the source and the polygons 12, 32, in the disclosed scanners 10 and 30; however, such optical devices do not form a part of the present invention. One of the main advantages of the disclosed embodiments -in which lenses 16 and 18 are interposed between the source and polygon 12 and lenses 36 and 38 are interposed between the source and polygon 32- is to permit the beam to enter the system in such a way that it makes as small an angle as practical with the optical axis at the polygon.

Details of the lens system for the embodiment shown in FIG. 2 are given in Table III. The system F-numbers are the same as those given in Table I.

TABLE III

| SURFACE | CURVATURE $(mm^{-1})$ | THICK-NESS (mm) | GLASS | REMARKS |
|---|---|---|---|---|
| Point 60 | 0.0 | 20. | Air | |
| 1a | −.00668905 | 58. | SF56 | N = 1.778662 |
| 2a | −.00668905 | 5.58 | Air | |
| 3a | 0.00225155 | 42. | BK7 | N = 1.515089 |
| 4a | 0.00056926 | 258.65 | Air | |
| 5a (Y-dir.) | 0.0 | 122.87 | Air | Cylinder Mirror |
| (X-dir.) | −.00384728 | | | |
| Image | 0.0 | 0.0 | Air | |

With reference to FIG. 4, there is shown a schematic of scanner 30, with certain elements omitted to more clearly show the path of the light beam. As shown in FIG. 4, a light beam 46 is incident on a facet 34 at a point 60. The light beam 46, between the source (not shown) and point 60, passes through lenses 38 and 36. The angle of incidence $\alpha$ and the angle of reflection $\beta$ are both 15°. For this particular orientation of the polygon 32, the rotation angle of polygon 32 is used to be zero, and the beam scan angle (with respect to the optical axis 44 of the lenses) is also said to be zero.

A set of three right-handed orthogonal coordinate systems have been shown with all of their origins at the common point 60. They all share a common X axis (not shown) which is perpendicular to the plane of the drawing and is parallel to the axis of rotation of the polygon 32. The X axis is also known as the cross-scan axis. The beam 46 enters in the −Z direction. When the angle of rotation is zero, the Z′ axis is normal to the facet 34. The Z″ axis coincides with the optical axis of the lenses. In the X-Y′-Z′ coordinate system, the center of rotation R of the polygon 32 is located at Z′ = ±38.1 mm and Y′ = −0.5 mm. (The −0.5 mm decentration in the Y′ direction is used to prevent the beam from spilling over the left edge of the facet at the +27° scan angle position, when the angle of incidence of the beam at the polygon is 28.5°.) As the polygon rotates through angles of −13.5°, 0°, and +13.5°, the reflected beam is scanned through angles from −27° to +27°, with respect to the Z″ axis.

Details of the performance of scanner 30 for a laser beam of a wavelength 632.8 nm are given in Table IV.

In Table IV, the radii for the gaussian beam are taken to the EXP (−2) intensity point in the beam section. At point 60, the beam parameters are: beam radius in X-direction, 0.1000 mm; beam radius in Y-direction, 2.5071 mm; radius of curvature in X direction, 266.38 mm; and radius of curvature in Y direction, 1000.29 mm. With reference to the data in Table IV relating to tangential focus error, deviation from f-$\theta$, and cross-scan image errors, these data were obtained in the same manner as indicated above for the corresponding items in Table II.

TABLE IV

| SCAN ANGLE | BEAM AT RECORD. MED. | | TAN FOC | DEV. FROM | CROSS-SCAN IMAGE ERROR | |
|---|---|---|---|---|---|---|
| | Beam X | Radius Y | Y | f-$\theta$ | +30″ | −30″ |
| deg. | micrometers | | mm | mm | micrometers | |
| −27 | 44.7 | 31.1 | .125 | −.732 | .056 | .023 |
| −18 | 44.3 | 30.6 | .121 | .363 | .032 | .042 |
| −9 | 44.1 | 30.2 | .018 | .487 | .030 | .040 |
| 0 | 44.0 | 30.0 | .000 | .000 | .033 | .033 |
| 9 | 44.1 | 30.2 | −.012 | −.528 | .035 | .029 |
| 18 | 44.3 | 30.6 | .034 | −.527 | .038 | .025 |
| 27 | 44.7 | 31.1 | .109 | .362 | .050 | .012 |

It will be apparent to those skilled in the art, from the data given in Tables II and IV, that excellent results are achieved from the use of the scanners disclosed herein. As shown in Tables II and IV, the spot size variation and deviation resulting from the f-$\theta$ condition are well within acceptable limits. Further, it has been found that in the operation of scanners 10 and 30 there is no "banding" in the images produced by the scanners.

The invention has been described in detail with particular reference to a preferred embodiment thereof, but it will be understood that variations and modifications can be effected within the spirit and scope of the invention.

We claim:

1. An optical scanner for scanning a light beam generated by a light source onto a receiving medium, said scanner comprising:
   deflector means for scanning said beam through a predetermined angle; and
   optical means interposed between said deflector means and said receiving medium, said optical means comprising a pair of spherical lenses and a cylindrical mirror disposed along an optical axis.

2. An optical scanner, as defined in claim 1, wherein said spherical lenses are interposed between said source and said deflector means.

3. An optical scanner, as defined in claim 1, wherein said deflector means comprises a polygon rotatable about an axis of rotation.

4. An optical scanner, as defined in claim 3, wherein the light beam between said light source and said deflector means forms an angle with the optical axis and lies in a plane defined by the optical axis and the axis of rotation of said polygon.

5. An optical scanner, as defined in claim 4, wherein said angle is about 4°.

6. An optical scanner, as defined in claim 4, wherein said cylinder mirror is disposed at an angle of about 22½° to said optical axis.

7. An optical scanner, as defined in claim 1, wherein said beam defines a plane as it is scanned through said predetermined angle, and the light beam between said light source and said deflector means is in said plane.

8. An optical scanner, as defined in claim 7, wherein the light beam between said source and said deflector means forms an angle of about 30° with said optical axis.

9. An optical scanner, as defined in claim 7, wherein said cylindrical mirror is disposed at an angle of about 45° to said optical axis.

10. An optical scanner, as defined in claim 1, wherein the beam from said deflector means is converging in the scan direction.

11. An optical scanner, as defined in claim 1, wherein both of said spherical lenses are positive lenses.

12. An optical scanner for scanning a light beam generated by a light source onto a receiving medium, said scanner comprising:
    deflector means for scanning said beam through a predetermined angle; and
    optical means interposed between said source and said deflector means for forming a converging beam in the scan direction at said deflector means, said optical means also being interposed between said deflector means and said receiving medium.

13. An optical scanner, as defined in claim 12, wherein said optical means comprises a pair of spherical lenses.

* * * * *

UNITED STATES PATENT AND TRADEMARK OFFICE
CERTIFICATE OF CORRECTION

PATENT NO. : 4,796,962

DATED : January 10, 1989

INVENTOR(S) : Donald DeJager and David Kessler

It is certified that error appears in the above-identified patent and that said Letters Patent are hereby corrected as shown below:

Title Page, Abstract, line 6, insert "the" before -- receiv- --.
Column 1, line 28, "not" should read -- no --.
Column 5, line 45, "used" should read -- said --.

Signed and Sealed this

Twenty-first Day of March, 1989

Attest:

DONALD J. QUIGG

*Attesting Officer*       *Commissioner of Patents and Trademarks*